March 1, 1938.  E. D. COOK  2,109,767
FILM DRIVING MECHANISM
Filed May 29, 1936
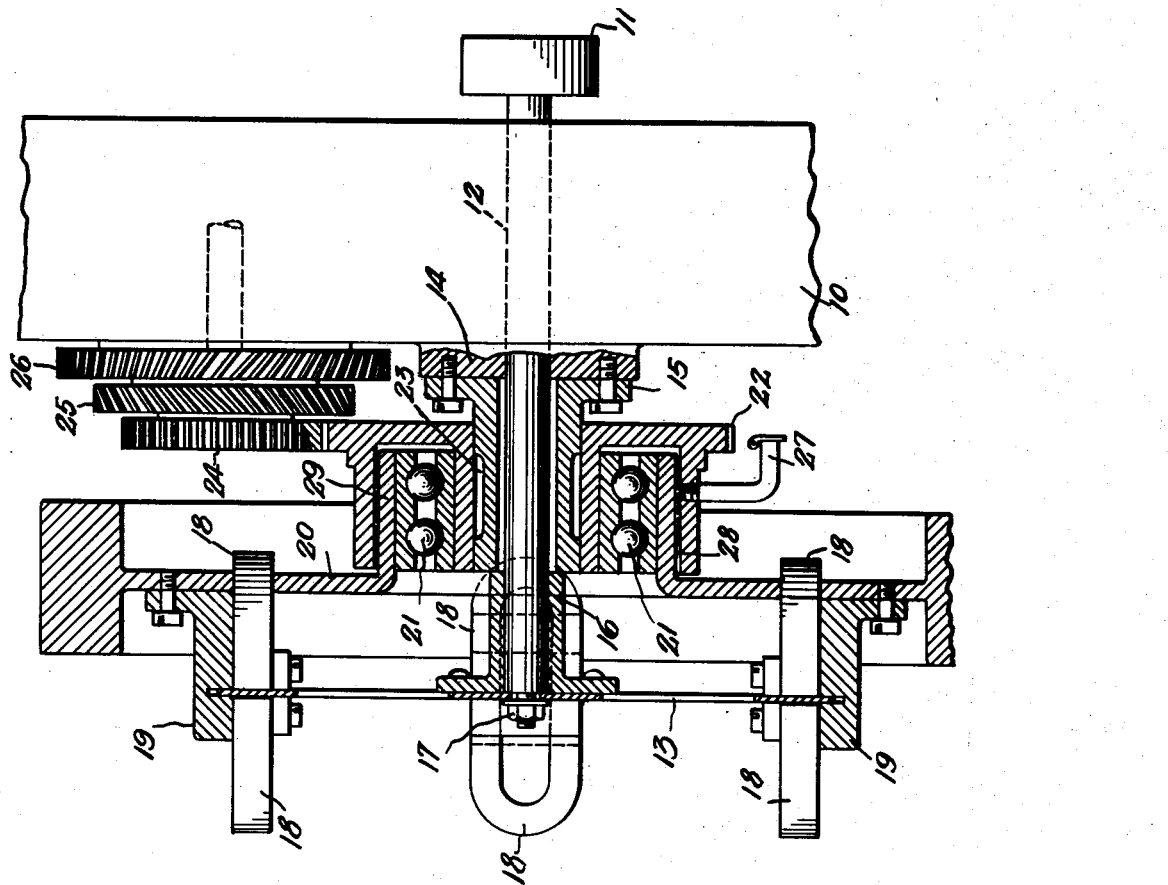
Inventor
Ellsworth D. Cook
by J. Huff
ATTORNEY.

Patented Mar. 1, 1938

2,109,767

UNITED STATES PATENT OFFICE 2,109,767

FILM DRIVING MECHANISM

Ellsworth D. Cook, Merchantville, N. J., assignor to Radio Corporation of America, a corporation of Delaware Application May 29, 1936, Serial No. 82,585

2 Claims. (Cl. 271—2.3)

This invention relates to an improved mechanism for driving film drums, and more particularly to a mechanism for driving sound record films past the sound pick-up point in sound picture apparatus.

In what are commonly referred to as "soundheads", for the reproduction of sound from film in conjunction with motion picture projectors, it is necessary to move the film at as nearly a uniform speed as possible past the sound pick-up point. Uniformity of motion is interfered with by intermittent feed of the film in the picture projector, by irregularities of the gear teeth in the driving mechanism, and by irregularities in the sprockets, and the impossibility of maintaining a definite sprocket hole pitch on the film. If the film is shrunken more or less than the amount for which the sprocket is designed, irregularities in film motion occur at the sprocket hole frequency.

The mechanism of my invention is designed to filter out from a driven film drum the effect of gear tooth irregularities, and other irregularities in motion transmitted from the driving mechanism; and on the other hand, to absorb the irregularities imparted to the film by the sprockets.

In order to do this, I use what may be referred to as a two-stage mechanical filter, one stage including a viscous drive and the other stage including a magnetic drive. These two types of drives have slightly different characteristics, and I accordingly use each in the location to which it is best suited.

It is old in the art to provide a drive for the film reproducing drum through a slipping clutch. One such mechanism was employed by Kellogg, U. S. 1,892,554, in a film recording machine. In that case the mechanical power to drive the film drum was derived through the main drive motor and was supplied through drive gears to the drive member of an electro-magnetic clutch which in turn drove the film drum and its attached heavy flywheel.

It was recognized that the drive member of the clutch would have speed irregularities, but the heavy flywheel on the film shaft was made adequate to prevent these from affecting the film motion at the translating point.

In certain applications the use of a heavy flywheel on the film drum shaft is undesirable. For example, during starting, both the film tension and the starting time are increased by its use. In my invention, the heavy flywheel on the film drum shaft is eliminated and a more constant motion is applied to the drive member of the slipping magnetic clutch for a film drum drive by inserting a second slipping clutch between the gears connected to the main motor and the driving member of the magnetic clutch on the film drum shaft, which is now made to have a large moment of inertia. Thus, in effect, the flywheel is transferred from the film drum shaft to its driving member.

One of the objects of my invention is to provide a film drum drive which will produce a substantially uniform motion of the film.

Another object of my invention is to provide a film drum drive which will absorb irregularities in the movement of the driving gears.

Another object of my invention is to provide a film drum drive which will absorb irregularities in the motion of the film.

Another object of my invention is to provide a film drum drive which will damp out any oscillations which may occur in the film.

Other and incidental objects of my invention will be apparent to those skilled in the art from a reading of the following specification and an inspection of the accompanying drawing, in which:

The single figure is a vertical sectional view of my film driving mechanism.

In the drawing, 10 represents the frame member or center plate of the sound-head or projector. The film is carried on a drum 11, adjacent which there is located an appropriate sound pick-up mechanism, such as an optical system for focusing a fine line of light on the film and a photo-cell for receiving the light transmitted by the film. The drum 11 is carried on a shaft 12, which passes through the apparatus and carries on its end a copper disc 13. This shaft 12 is carried in appropriate bearings in the frame 10. There is also carried on an appropriate bushing 14, the bearing member 15, which is secured to the member 10.

At the outer end of the shaft 12, there is provided a collar 16, which holds the shaft against longitudinal movement and serves to hold the copper disc 13 in proper position. This whole assembly is held together by the nut 17.

The copper plate 13 passes between the poles of pairs of magnets 18, of which four pairs are indicated, although more may be used. I prefer to use electro-magnets for ease of proper adjustment, but obviously can employ permanent magnets as shown. When these magnets are properly located in relation to the copper disc 13, eddy currents are set up in the copper which produce counter-magnetic fields, thereby causing the copper disc to be driven in the same direction as the magnets. These magnets are carried on brackets 19, which in turn are carried on a heavy circular member 20 which is rotatable on the ball bearings 21. These bearings 21 are seated in an annular recess in the gear member 22. The gear member 22 is rotatable on the exterior of the bearing member 15, which is cut away, as shown at 23, to reduce friction.

The gear 22 is driven from the gear 24, which is integral with the gears 25 and 26, one of these gears being driven from an appropriate source of power, in this case the main projector drive motor.

Oil of the proper viscosity is introduced through the pipe 27 into the annular space 28 between the outer shell of the gear member 22 and the cylindrical extension of the member 20, which is indicated at 29.

It will be apparent that when the gear 24 is rotated, thereby rotating the gear member 22, the oil in the annular space 28 will produce a viscous frictional drag on the cylindrical extension 29 of the member 20, thereby causing the member 20 to rotate in the same direction as the gear member 22. Since the member 20 carries on its periphery the magnets 18, which are relatively heavy, this member will act as a flywheel, tending to rotate at a uniform speed. Any sudden irregularities in the movement of the gear 25 or the gear member 22 will therefore be absorbed by the film of oil without materially affecting the rate of rotation of the magnets 18, which will tend to drive the copper disc 13 at a uniform speed.

If any sudden irregularity is imparted to the film, as for example any irregularity in the sprocket holes, this will cause a movement of the drum 11 and a corresponding movement of the disc 13. Here again, however, the magnets 18 will tend to rotate at a uniform speed, and the movement of the disc 13 will be counteracted by the eddy currents induced therein, which will immediately damp out the movement without producing any oscillation. The small forces transmitted through the film are incapable of affecting the motion of the relatively heavy member 20.

It will be apparent that my apparatus is highly advantageous in that it not merely absorbs irregularities in the drive, but also absorbs irregularities imparted to the film independently of the function of the drive filter.

Having now described my invention, I claim:

1. In combination, a film drum having a shaft, an eddy current disc on the end of said shaft, rotatable magnetic means for driving said disc, driving means, and means providing a viscous coupling between said driving means and said rotatable magnetic means.

2. In combination, a film drum having a shaft, an eddy current disc on the end of said shaft, rotatable magnetic means for driving said disc, a flywheel integral with said magnetic means, driving means, and means providing a viscous coupling between said driving means and said rotatable magnetic means.

ELLSWORTH D. COOK.